(12) United States Patent
Shi

(10) Patent No.: US 12,238,706 B2
(45) Date of Patent: Feb. 25, 2025

(54) METHODS FOR INFORMATION TRANSMISSION

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 377 days.

(21) Appl. No.: 17/721,050

(22) Filed: Apr. 14, 2022

(65) Prior Publication Data

US 2022/0240282 A1 Jul. 28, 2022

Related U.S. Application Data

(63) Continuation of application No. PCT/CN2019/116893, filed on Nov. 8, 2019.

(51) Int. Cl.
*H04W 72/1268* (2023.01)
*H04W 74/0808* (2024.01)
*H04W 72/23* (2023.01)

(52) U.S. Cl.
CPC ... *H04W 72/1268* (2013.01); *H04W 74/0808* (2013.01); *H04W 72/23* (2023.01)

(58) Field of Classification Search
CPC ......... H04W 72/1268; H04W 74/0808; H04W 72/23
See application file for complete search history.

(56) References Cited

U.S. PATENT DOCUMENTS

| 2017/0332358 | A1 | 11/2017 | Park et al. | |
| 2021/0029768 | A1* | 1/2021 | Shih | H04W 72/23 |
| 2021/0105096 | A1* | 4/2021 | Chin | H04L 1/1812 |
| 2021/0218503 | A1* | 7/2021 | Babaei | H04W 72/23 |

FOREIGN PATENT DOCUMENTS

| CN | 105611637 | 5/2016 |
| CN | 107770868 | 3/2018 |
| CN | 107787005 | 3/2018 |

OTHER PUBLICATIONS

EPO, Communication for EP Application No. 19951383.9, Jan. 18, 2024.
Interdigital, "Handling UL LBT Failures in MAC," 3GPP RAN WG2 Meeting #108, R2-1914882, Nov. 2019.
EPO, Communication for EP Application No. 19951383.9, Aug. 9, 2023.

(Continued)

*Primary Examiner* — Duc C Ho
(74) *Attorney, Agent, or Firm* — Hodgson Russ LLP

(57) ABSTRACT

Methods for information transmission are provided in implementations of the disclosure. The method includes reporting a first message through a first uplink (UL) resource, where the first message is used for indicating that M consistent UL listen before talk (LBT) failure are triggered on M secondary cells (SCells), a trigger moment of each of the M consistent UL LBT failure is earlier than a transmission moment corresponding to the first UL resource, the M SCells belong to a same cell group (CG), and M is a positive integer greater than or equal to 1.

20 Claims, 7 Drawing Sheets

(56) References Cited

OTHER PUBLICATIONS

IPI, Office Action for IN Application No. 202227020795, Jul. 31, 2023.
Apple Inc., "Feature Lead Summary 3 on SCell BFR and L1-SINR," 3GPP TSG-RAN WG1 Meeting #98bis, R1-1911549, Oct. 2019.
OPPO, "Discussion on Multi-beam Operation Enhancements," 3GPP TSG RAN WG1 #98bis, R1-1910117, Oct. 2019.
JPO, Office Action for JP Application No. 2022-525335, Sep. 29, 2023.
ZTE Corporation et al., "LBT failure report on SCell," 3GPP TSG RAN WG2 NR #108 Meeting, R2-1914791, Nov. 2019.
Qualcomm Incorporated, "Details of the Uplink LBT failure mechanism," 3GPP TSG-RAN2#107bis, R2-1912304, Oct. 2019.
Lenovo et al., "Details of SCell Beam Failure Recovery Procedure," 3GPP TSG-RAN WG2 Meeting #108, R2-1915109, Nov. 2019.
EPO, Extended European Search Report for EP Application No. 19951383.9, Jul. 26, 2022.
EPO, Communication for EP Application No. 19951383.9, Feb. 24, 2023.
CNIPA, First Office Action for CN Application No. 202210228602.7, Apr. 11, 2023.
Qualcomm Inc., "New WID on NR-based Access to Unlicensed Spectrum," 3GPP TSG RAN Meeting #82, RP-182878 (revision of RP-182806), Dec. 2018.
VIVO, "Discussion on the Recovery Procedure of the UL LBT Failure," 3GPP TSG-RAN WG2 Meeting #106, R2-1905626, May 2019.
WIPO, International Search Report for PCT/CN2019/116893, Jul. 13, 2020.

* cited by examiner

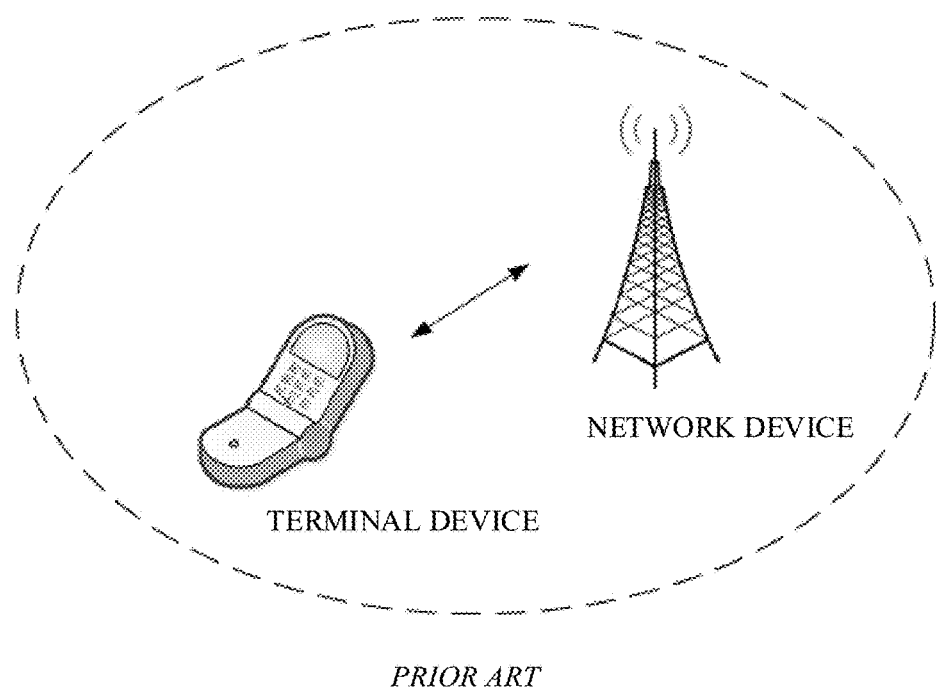
*PRIOR ART*
FIG. 1
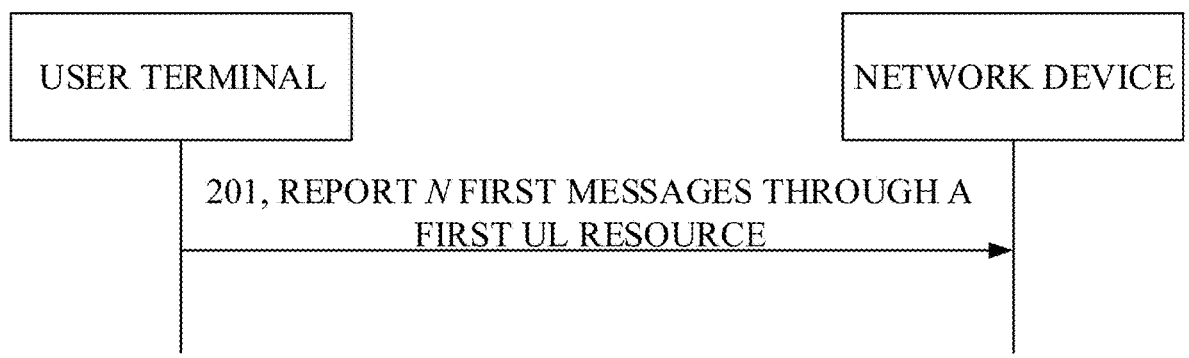
FIG. 2
| 0 | 0 | 0 | 1 | 0 | 0 | 0 | 1 | 0 | 0 | ... |
|---|---|---|---|---|---|---|---|---|---|---|
| 1 | 2 | 3 | 4 | 5 | 6 | 7 | 8 | 9 | 10 | |
FIG. 3

METHODS FOR INFORMATION TRANSMISSION

CROSS-REFERENCE TO RELATED APPLICATION(S)

This application is a continuation of International Application No. PCT/CN2019/116893, filed on Nov. 8, 2019, the entire disclosure of which is incorporated herein by reference.

TECHNICAL FIELD

The disclosure relates to the technical field of communication, and in particular to methods for information transmission.

BACKGROUND

In a new radio unlicensed (NR-U) system, in order to make all communication systems that use unlicensed spectrum for wireless communication coexist in this spectrum in a friendly way, all communication systems need to follow a principle of "listen before talk (LBT)". That is, before a communication device performs signal transmission on a channel in the unlicensed spectrum, the communication device may listen to the channel. If a listen result of the channel is that the channel is vacant, the communication device can perform signal transmission. If the listen result of the channel is that the channel is occupied, the communication device cannot perform signal transmission.

In addition, if a listen result corresponding to consistent uplink (UL) transmission is that the channel is occupied, a UL LBT failure event is triggered. However, the LBT failure event may lead to radio link failure (RLF) between the communication device and a network, so that radio resource control (RRC) connection may be re-established, thereby affecting a communication process.

SUMMARY

Methods for information transmission are provided in implementations of the disclosure.

According to a first aspect, a method for information transmission is provided in implementations of the disclosure. The method is applied to a user terminal and includes reporting a first message through a first UL resource, where the first message is used for indicating that M consistent UL LBT failure are triggered on M secondary cells (SCells), a trigger moment of each of the M consistent UL LBT failure is earlier than a transmission moment corresponding to the first UL resource, the M SCells belong to a same cell group (CG), and M is a positive integer greater than or equal to 1.

According to a second aspect, a method for information transmission is provided in implementations of the disclosure. The method is applied to a network device and includes receiving a first message reported through a first UL resource, where the first message is used for indicating that M consistent UL LBT failure are triggered on M SCells, a trigger moment of each of the M consistent UL LBT failure is earlier than a transmission moment corresponding to the first UL resource, the M SCells belong to a same CG, and M is a positive integer greater than or equal to 1.

BRIEF DESCRIPTION OF THE DRAWINGS

FIG. 1 is a schematic architecture diagram illustrating a communication system provided in implementations of the disclosure.

FIG. 2 is a schematic flow chart illustrating a method for information transmission provided in implementations of the disclosure.

FIG. 3 is a schematic diagram illustrating a bitmap provided in implementations of the disclosure.

DETAILED DESCRIPTION

Figure 4:
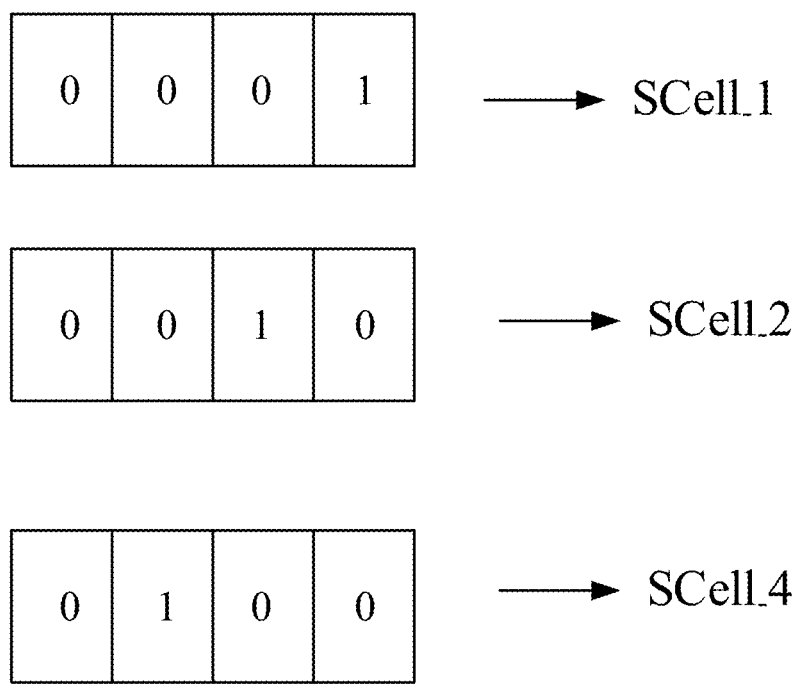
FIG. 4 is a schematic diagram illustrating a binary code provided in implementations of the disclosure.

The terms used in implementations of the disclosure are only for the purpose of explaining specific implementations of the disclosure rather than limiting the disclosure. The terms "first", "second", "third", "fourth", and the like used in the specification, the claims, and the accompany drawings of the disclosure are used to distinguish different objects rather than describe a particular order. In addition, the terms "include", "comprise", and "have" as well as variations thereof are intended to cover non-exclusive inclusion.

Implementations of the disclosure can be applicable to various communication systems, for example, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a wireless local area networks (WLAN), a wireless fidelity (WiFi), a next-generation communication system, or other communication systems.

Generally, a conventional communication system supports a limited number of connections and therefore is easy to implement. However, with development of the communication technology, the mobile communication system can not only support conventional communication, but also support, for example, device to device (D2D) communication, machine to machine (M2M) communication, machine type communication (MTC), vehicle to vehicle (V2V) communication. Implementations of the disclosure also can be applied to these communication systems.

Alternatively, a communication system in implementations of the disclosure can be applicable to a carrier aggregation (CA) scenario, a dual connectivity (DC) scenario, and a standalone (SA) layout scenario.

A spectrum applied is not limited in implementations of the disclosure. For example, implementations of the disclosure can be applied to a licensed spectrum and also can be applied to an unlicensed spectrum.

Referring to FIG. 1, FIG. 1 is a schematic architecture diagram illustrating a communication system provided in implementations of the disclosure. The communication system includes a network device and a terminal device. As illustrated in FIG. 1, the network device can communicate with the terminal device. The communication system may be a 5th generation (5G) communication system (e.g., NR), a communication system integrating multiple communication technologies (e.g., a communication system integrating LTE technology and NR technology), or a subsequent evolved communication system. The forms and number of the network device and the terminal device are only for examples and do not constitute any limitation on the implementations of the disclosure.

The terminal device in the disclosure may be a device with wireless communication functions and deployed on land, including indoor or outdoor, handheld, wearable, or vehicle-mounted; on water (e.g., a ship); and also in the air (e.g., aircraft, balloons, and satellites). The terminal device may be a mobile phone, a pad, a computer with wireless receiving and transmitting functions, a terminal device for virtual reality (VR), a terminal device for augmented reality (AR), a wireless terminal in industrial control, a wireless terminal in self driving, a wireless terminal in remote medical, a wireless terminal in smart grid, a wireless terminal in smart home, or the like. The terminal device may also be a handheld device with wireless communication functions, an in-vehicle device, a wearable device, a computing device, or other processing devices coupled with a wireless modem. The terminal device can have different names in different networks, such as a terminal device, an access terminal, a subscriber unit, a subscriber station, a mobile station, a mobile platform, a remote station, a remote terminal, a mobile device, a user terminal, a terminal, a wireless communication device, a user agent or a user apparatus, a cellular radio telephone, a cordless telephone, a session initiation protocol (SIP) telephone, a wireless local loop (WLL) station, a personal digital assistant (PDA), or a terminal device in the 5G network or a future evolved network.

The network device in the disclosure is a device deployed in the wireless access network to provide wireless communication function. For example, the network device may be a radio access network (RAN) device at an access network side in the cellular network. The RAN device is a device for connecting the terminal device to the radio network, including but not limited to an evolved node b (eNB), a radio network controller (RNC), a node b (NB), a base station controller (BSC), a base transceiver station (BTS), a home base station (e.g., a home evolved node b, home node b, or HNB), a base band unit (BBU), a mobility management entity (MME). For example, the network device may also be a node device in WLAN, e.g., an access controller (AC), a gateway, or a WiFi access point (AP). For example, the network device may also be a transmission point or a transmission reception point (TRP or TP) in NR system.

The unlicensed spectrum is a spectrum that is divided according to nations and regions and is available for communication of a radio device. Generally, the spectrum is regarded as a shared spectrum, i.e., communication devices in different communication systems can use the spectrum and may not to apply for an exclusive spectrum license from government as long as these communication devices satisfy regulatory requirements on the spectrum set by the nations or regions.

In order to make all communication systems that use the unlicensed spectrum for wireless communication coexist in the spectrum in a friendly way, some nations or regions stipulate regulatory requirements that must be satisfied when the unlicensed spectrum is used. For example, a communication device follows a principle of "listen before talk (LBT)". That is, before a communication device performs signal transmission on a channel in the unlicensed spectrum, the communication device may listen to the channel. If a listen result of the channel is that the channel is vacant, the communication device can perform signal transmission. If the listen result of the channel in the unlicensed spectrum is that the channel is occupied, the communication device cannot perform signal transmission. In order to ensure fairness, in a transmission, a duration for the communication device to use the channel in the unlicensed spectrum for signal transmission cannot exceed a maximum channel occupancy time (MCOT).

In addition, if the listen result of the channel is that the channel is occupied, an uplink (UL) LBT failure event is triggered. LBT failure due to consistent UL transmission performed by a transmit end may lead to radio link failure (RLF), and thus radio resource control (RRC) connection may be re-established, thereby affecting a communication process.

For that a user equipment (UE) triggers consistent UL LBT failure on a secondary cell (SCell) under DC, three aspects below may be considered by inventors.

(1) What the priority of this medium access control (MAC) control element (CE) shall be in the link control protocol (LCP).
(2) If we need to handle a case when there are no subsequent UL resources available.
(3) If we need to limit this MAC CE transmission to other bandwidth parts (BWPs) than the BWP where LBT failure is declared.

For the first aspect, in our view, an SCell may have a problem if UE detects consistent UL LBT failure which is similar to the case when UE declares beam failure for that SCell, thus we think the MAC CE for reporting the SCell LBT problem can have the similar priority as the beam failure recovery (BFR) MAC CE being discussed.

Proposal 1: An MAC CE for UL LBT problem can have a similar priority as the BFR MAC CE.

Regarding the second aspect, we think similar as a BFR MAC CE case, when there is no available UL resource, UE would need to send a scheduling request (SR) to the network to request uplink resources, otherwise, the network would not realize the UL LBT issue.

Proposal 2: Similar as a BFR MAC CE, UE can trigger an SR if there is no available UL resources for sending the MAC CE for the SCell UL LBT problem.

Regarding the third aspect, there is no need to have this limitation that the MAC CE should be transmitted on a different serving cell other than the SCell which has the UL LBT problem. The reason is that consistent LBT failure only reflects the channel occupancy condition for a period, it does not mean that the channel is always occupied.

Proposal 3: No need to have the limitation that the MAC CE should be transmitted on a different serving cell other than the SCell which has the UL LBT problem The MAC CE should be used to indicate which SCell has consistent UL LBT failure, there is no need to trigger the MAC CE again if there is already an MAC CE triggered but not sent to the network.

Proposal 4: No need to re-trigger the MAC CE if there is already an MAC CE triggered for consistent UL LBT failure for an SCell.

Regarding the MAC CE format, we think consistent UL LBT failure is triggered independently among different SCells. It could be possible that there are multiple MAC CEs triggered for different SCells if those SCells have consistent UL LBT failure. From this perspective, it's beneficial to include all the related SCells which have consistent UL LBT failure into a single MAC CE format, i.e., the MAC CE format should support multiple entry to indicate multiple SCells which have consistent UL LBT failure.

Proposal 5: The MAC CE format should support multiple entry to indicate all the SCells which have consistent UL LBT failure.

The proposal 2 will be described below with specific examples.

1) The UE triggers consistent UL LBT failure on an SCell. The SCell may be an SCell in a master cell group (MCG) and may also be an SCell in a secondary cell group (SCG). The MCG is an MCG under DC, and the SCG is an SCG under DC.
2) The UE determines whether an available UL resource is on all serving cells in a CG corresponding to the SCell. The available UL resource includes a dynamically scheduled UL resource and a semi-persistently configured UL resource.
3) As for proposal 2, if the UE finds an available UL resource, the UE transmits the MAC CE on the UL resource; if the UE finds no available UL resource, the UE can trigger an SR.
   a. The SR may be a dedicated SR configuration specially configured for the CG and may also be an SR configuration for a logical channel;
   b. The SR is used for requesting a UL resource.
4) The UE transmits the MAC CE according to a received UL resource.
5) If the UE determines that the MAC CE is successfully received by the network, the UE cancels all triggered MAC CEs corresponding to the CG.
   a. The UE determining that the MAC CE is successfully received by the network refers to that the UE does not receive a retransmission scheduling of the MAC CE within a range of a timer or the UE receives a new transmission scheduling of a hybrid automatic repeat request (HARM) for the MAC CE.
6) On condition that the UE transmits the MAC CE on the UL resource and performs UL assembling, a priority of the MAC CE is at least higher than that of data to-be-transmitted.

The proposal 5 will be described below with specific examples.

Figure 13:
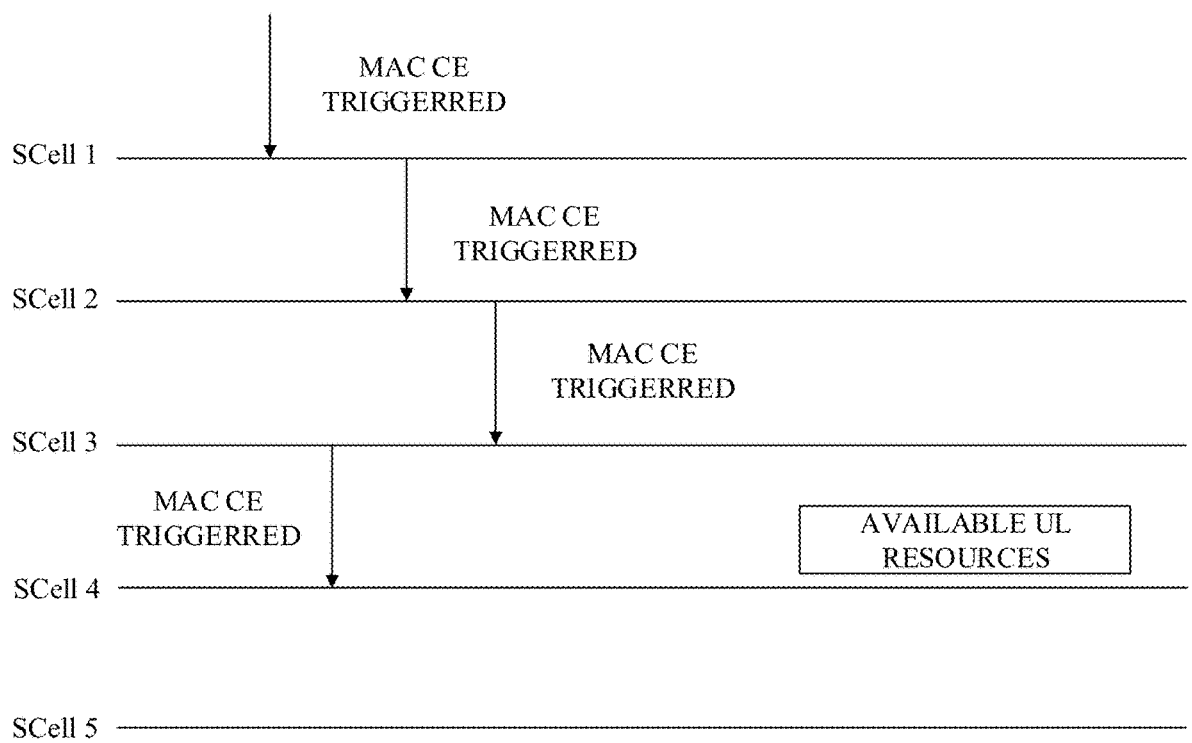
FIG. 13 is a schematic diagram illustrating triggering of consistent UL listen before talk (LBT) failure on secondary cells (SCells) provided in implementations of the disclosure.

As illustrated in FIG. 13, supposing there are five SCells, on each of four SCells in the five SCells consistent UL LBT failure is triggered, i.e., corresponding MAC CEs are respectively triggered.

An available UL transmission resource is on SCell4, so that the UE can transmit information of SCell1~4 on the UL transmission resource, i.e., the four SCells are SCells on each of which consistent UL LBT failure is triggered.

The UE can transmit the MAC CE in multiple manners, for example the following.

1) An LBT failure MAC CE transmitted on the available UL transmission resource contains the information of SCell1~4.
2) A bitmap can be designed. A length of the bitmap corresponds to number of SCells supported by the CG, such as 16 bits. Bits in the bitmap correspond to values of SCell indexes in ascending or descending order. If a bit is set to 1, it is indicated that LBT failure occurs on a corresponding SCell. If the bit is set to 0, it is indicated that there is no LBT failure on the corresponding SCell. The length of the bitmap may also be number of SCells configured in the CG, and the bits of the bitmap correspond to the values of the SCell indexes in ascending or descending order.

Another manner (MAC CE format with single entry) includes the following.

LBT failure MAC CEs respectively triggered by SCell1~SCell4 are transmitted on an available transmission resource. That is, four independent MAC CEs are transmitted, and the MAC CEs each have an SCell index.

With the implementations above, it is beneficial to improve efficiency of reporting consistent UL LBT failure by the SCell, thereby saving an MAC CE overhead.

For the three aspects above that may be considered, some other solutions are further provided in the disclosure, which will be described below through specific implementations. FIG. 2 is a schematic flow chart illustrating a method for information transmission provided in implementations of the disclosure. The method includes but is not limited to the following operations.

At 201, a user terminal reports to a network device a first message through a first UL resource. The network device then receives the first message reported through the first UL resource.

In an implementation, the user terminal reports N first messages through the first UL resource to the network device.

The N first messages are used for indicating M UL LBT failure events. The M UL LBT failure events are associated with M SCells, i.e., the user terminal triggers a UL LBT failure event when the user terminal performs LBT on each of the M SCells. Triggering of the UL LBT failure event refers to that number of failure of LBT performed on the SCell by the user terminal is greater than a threshold.

The M SCells belong to a same CG. The network device is a network device corresponding to a primary cell (PCell) in the CG or a network device corresponding to the SCell, where a form of the network device is not limited in the disclosure.

N and M are positive integers greater than or equal to 1.

In addition, a trigger moment of each of the M UL LBT failure events is earlier than a transmission moment corresponding to the first UL resource. That is, a trigger moment of triggering the UL LBT event on each SCell by the user terminal is earlier than the transmission moment corresponding to the first UL resource. The transmission moment is a moment that the user terminal can use the first UL resource to perform signal transmission, i.e., a slot in the first UL resource.

Furthermore, the network device can reconfigure or control a UL LBT process performed by the user terminal after the network device determines that the user terminal triggers the UL LBT failure event, thereby avoiding RLF.

It can be seen that, in implementations of the disclosure, when the user terminal triggers the UL LBT failure event on the SCell, the terminal device transmits the first message to the network device through a first communication resource, to indicate the UL LBT failure event, thereby facilitating the network device to control the UL LBT failure event, avoiding UL RLF, and thus optimizing the communication process.

In some possible implementations, M is greater than 1 and N is 1, i.e., before the transmission moment corresponding to the first UL resource, the user terminal triggers the UL LBT failure events on multiple SCells. In this case, one first message is adopted to indicate the network device that the user terminal triggers the UL LBT failure events on the multiple SCells.

Specifically, the bitmap can be adopted to transmit the first message. Position information of bit A in the bitmap is used to indicate a cell identity of an SCell corresponding to the position information, a bit value of the bit A is used to indicate whether the user terminal triggers the UL LBT failure event on the SCell, and the bit A is a bit in the bitmap.

If the bit value is 1, it is indicated that the user terminal triggers the UL LBT failure event on an SCell corresponding to this position. If the bit value is 0, it is indicated that the user terminal does not trigger the UL LBT failure event on the SCell corresponding to this position. It can be understood that, using 0 and 1 to indicate the UL LBT failure event is only for example and illustration, which will not be limited herein.

The first message is transmitted via the bitmap, and multiple UL LBT failure events can be reported through one first message, thereby improving efficiency of reporting the UL LBT failure event.

For example, if the user terminal triggers the UL LBT failure event on SCell-4 and SCell-8 (4 and 8 are cell identities of SCells), bit values in the bitmap corresponding to the cell identities of SCell-4 and SCell-8 can be set to 1. As illustrated in FIG. 3, bit values of a fourth bit and an eighth bit in the bitmap are set to 1.

Furthermore, the length of the bitmap can correspond to a preset number of SCells in the CG, i.e., a certain number of SCells are preset in each CG, that is also to say, the preset number of the SCells are at most configured in each CG. Alternatively, the length of the bitmap corresponds to a configured number (actual number) of SCells in the CG.

For example, it can be preset that in each CG 16 SCells can be configured, but only 8 SCells are configured in the CG in actual configuration. Therefore, the length of the bitmap may be 16 or 8. It is to be noted that if the length of the bitmap is 16, 8 bits are left when the first message is generated. In actual applications, the 8 bits can be vacant or set to 0 or other values, which will not be limited herein.

In some possible implementations, M is greater than 1, N is also greater than 1, and M is equal to N, i.e, before the transmission moment corresponding to the first UL resource, the user terminal triggers the M UL LBT failure events on the M SCells, and the network device transmits M first messages to indicate cell identities of the M SCells. In fact, the user terminal transmits the M first messages to the network device, where for each first message, the first message contains a cell identity of an SCell corresponding to a UL LBT failure event, and the first message is used to indicate that the user terminal triggers the UL LBT failure event on the SCell. Therefore, the network device analyzes each first message after obtaining the M first messages, i.e., the network device obtains the cell identities of the M SCells on which UL LBT failure events are triggered.

Specifically, for each UL LBT failure event, a first message is generated, where the first message is used to indicate that the user terminal triggers the UL LBT failure event on an SCell corresponding to the UL LBT failure event, and the first message contains a cell identity of the SCell. Each first message can be obtained by coding a cell identity of each SCell in a binary code manner.

For example, as illustrated in FIG. 4, when the user terminal triggers the UL LBT failure event on SCell-1, SCell-2, and SCell-4, cell identities of SCell-1, SCell-2, and SCell-4 can be coded in the binary code manner, to respectively obtain a first message corresponding to SCell-1, a first message corresponding to SCell-2, and a first message corresponding to SCell-4.

In some implementations, N is 1 and M also is 1, i.e., before the transmission moment corresponding to the first UL resource, the user terminal triggers the UL LBT failure event only on one SCell. Therefore, the user terminal can transmit one first message to the network device to indicate the UL LBT failure event triggered by the user terminal.

The first message can be obtained through the bitmap, i.e., a bit corresponding to the SCell in the bitmap is set to 1, and other bits are all set to 0. The first message also can be obtained by coding a cell identity of the SCell in the binary code manner, which will not be limited herein.

Figure 5:
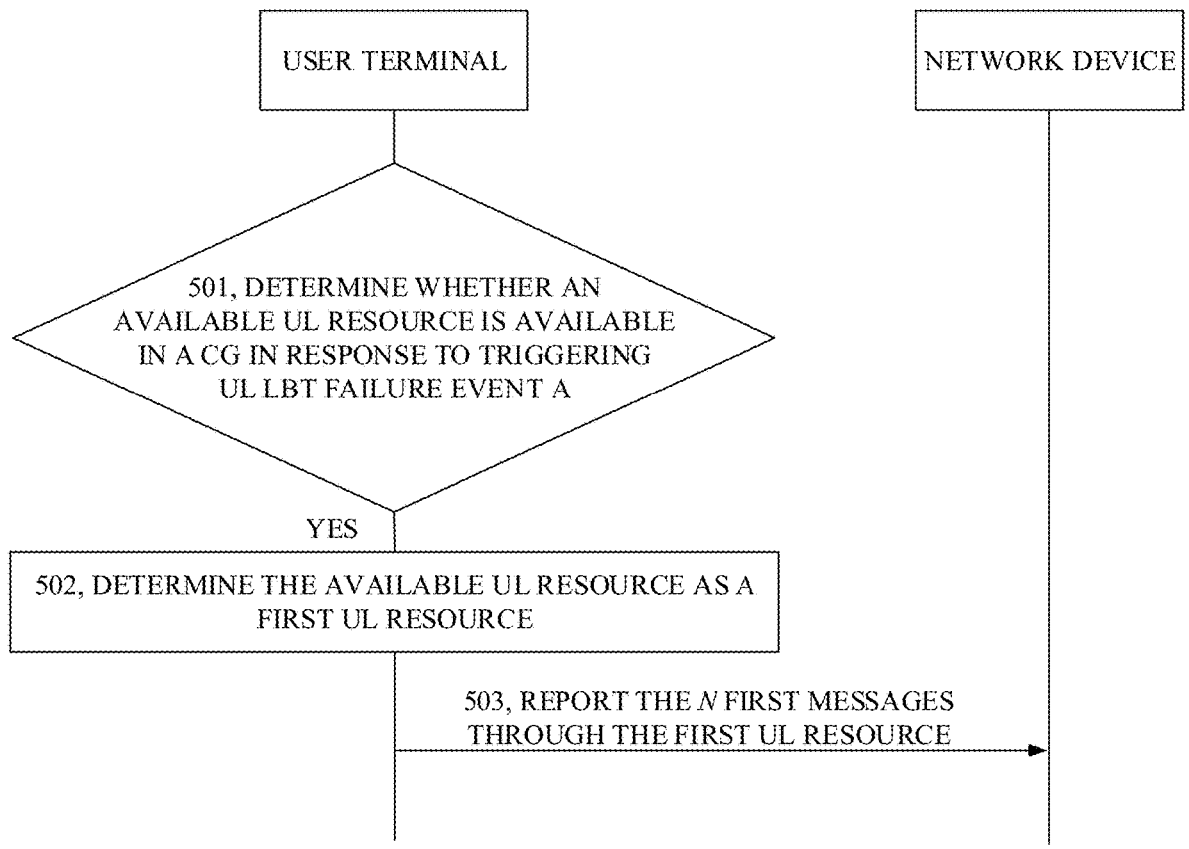
FIG. 5 is a schematic flow chart illustrating another method for information transmission provided in implementations of the disclosure.

FIG. 5 is a schematic flow chart illustrating another method for information transmission provided in implementations of the disclosure. Contents in the implementation herein are the same as those in the implementation illustrated in FIG. 2 and will not be repeated herein. The method includes but is not limited the following.

At 501, a user terminal determines whether an available UL resource is in a CG in response to triggering UL LBT failure event A.

When the user terminal triggers a UL LBT failure event, i.e., the UL LBT failure event A, on an SCell at t+i moment, the user terminal determines whether an available UL resource exists in the CG after t moment. If there is an available UL resource, when the available UL resource arrives, the user terminal reports N first messages to the network device through the UL resource or a part of the UL resource.

The available UL resource includes a dynamically scheduled UL resource and/or a semi-persistently configured UL resource.

Figure 6:
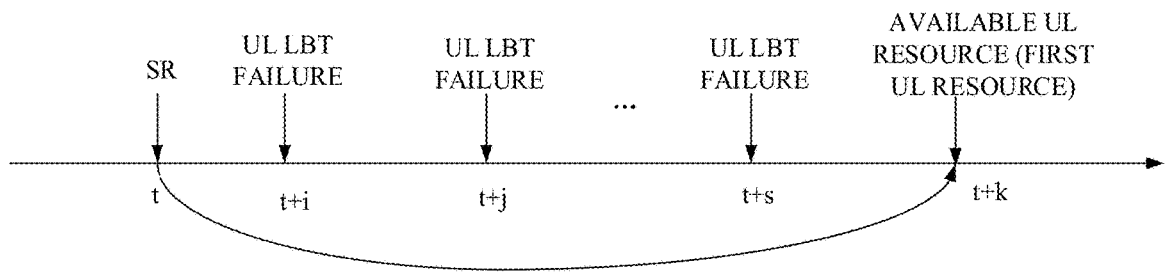
FIG. 6 is a schematic diagram illustrating a manner of determining an available uplink (UL) resource provided in implementations of the disclosure.

As illustrated in FIG. 6, the user terminal triggers the UL LBT failure event on the SCell at t+i moment, but the user terminal determines that an available UL resource will arrive at t+k moment. Therefore, the user terminal may not apply for additional UL resources and can use the available UL resource to transmit the N first messages at t+k moment.

It can be understood that, when waiting for arrival of the available UL resource, the user terminal further may trigger the UL LBT failure event on other SCells, and a trigger moment of the UL LBT failure event on the other SCells is later than t+i moment and earlier than t+k moment. Therefore, other triggered UL LBT failure events also can be reported through the available UL resource at t+k moment. That is, when the trigger moment of each of the M UL LBT failure events is earlier than a transmission moment corresponding to the available UL resource, the available UL resource can be adopted to report the N first messages corresponding to the M UL LBT failure events, where $0<i<j<s<k$.

In addition, the available UL resource at t+k moment is obtained through a UL SR transmitted by the user terminal at t moment. That is, the user terminal transmits at t moment the SR to the network device for data transmission, and the network device indicates through scheduling that the user terminal can perform data transmission at t+k moment, i.e., a transmission moment corresponding to the available UL resource used for terminal scheduling is t+k moment.

It is to be noted that, an initial purpose of the available UL resource is to transmit data to-be-transmitted. However, the UL LBT failure event is triggered before t+k moment, in order not to affect a communication process of the user terminal, the UL LBT failure event may be reported first, i.e., a transmission priority of each of the N first messages is set to be higher than that of the data to-be-transmitted before the N first messages are reported.

At 502, when there is an available UL resource, the user terminal determines the available UL resource as a first UL resource.

At 503, the user terminal reports the N first messages through the first UL resource.

It can be seen that, in implementations of the disclosure, when the user terminal triggers the UL LBT failure event on the SCell, the user terminal transmits the first message to the network device through a first communication resource, to indicate the UL LBT failure event, thereby facilitating the network device to control the UL LBT failure event, avoiding UL RLF, and thus optimizing the communication process. In addition, the user terminal preferentially selects the available UL resource in the CG, improving a utilization rate of the UL resource. Further, the user terminal preferentially uses an existing UL resource, so that a success rate of reporting the UL LBT failure event can be improved.

Figure 7:
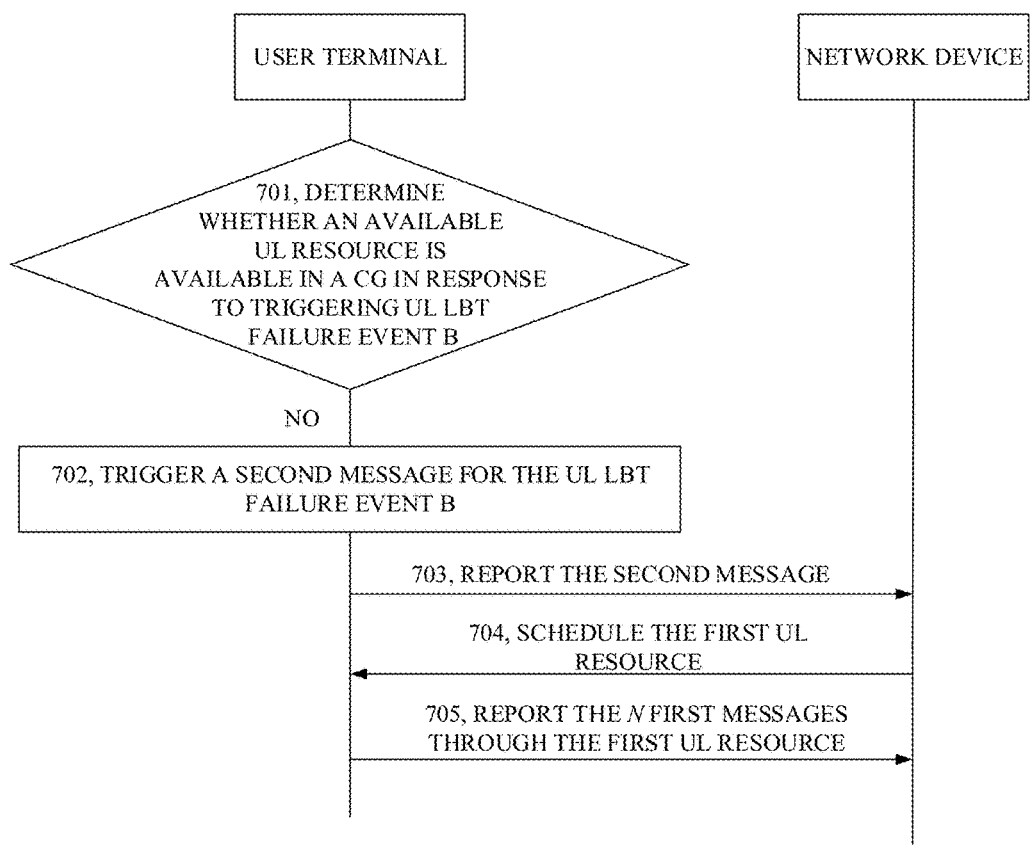
FIG. 7 is a schematic flow chart illustrating another method for information transmission provided in implementations of the disclosure.

FIG. 7 is a schematic flow chart illustrating another method for information transmission provided in implementations of the disclosure. Contents in the implementation herein are the same as those in the implementations illustrated in FIG. 2 and FIG. 5 and will not be repeated herein. The method includes but is not limited the following.

At 701, a user terminal determines whether an available UL resource is in a CG in response to triggering UL LBT failure event B.

UL LBT failure event B is a first UL LBT failure event in the M UL LBT failure events, i.e., a UL LBT failure event with the earliest trigger moment.

At 702, if there is no available UL resource, the user terminal triggers a second message for the UL LBT failure event B.

Figure 8:
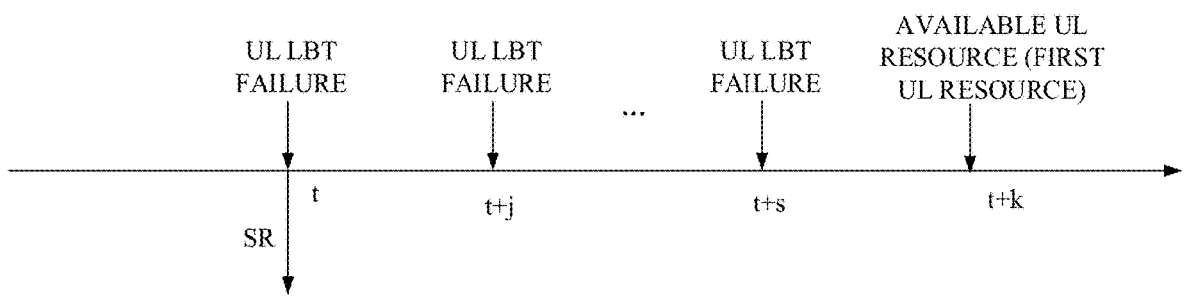
FIG. 8 is a schematic diagram illustrating another manner of determining an available UL resource provided in implementations of the disclosure.

Specifically, as illustrated in FIG. 8, when the UE triggers the UL LBT failure event on an SCell at t moment, and in this case, in the CG there is no available UL resource for the user terminal. Therefore, in order to report the UL LBT failure event, the user terminal generates the second message at t moment and transmits the second message to the network device through a control channel (CC). The second message is used for requesting the network device to schedule a first UL resource for the user terminal, such that the user terminal can use the first UL resource to report the UL LBT failure event.

It can be understood that, after the user terminal transmits the second message at t moment, a UL resource within a time period after t moment may be occupied by other user terminals. Therefore, a transmission moment corresponding to the first UL resource scheduled by the network device for the user terminal is t+k, and the user terminal may wait for arrival of the first UL resource at t+k moment and then adopt the first UL resource to report N first messages.

However, the user terminal also may trigger the UL LBT failure event on other SCells between t moment and t+k moment. Therefore, there may be M UL LBT failure events between t moment and t+k moment. However, since the first UL resource is requested at t moment, when the UL LBT failure event is triggered between t moment and t+k moment, an available UL resource (i.e., the first UL resource) can be found in the CG, and the second message may not be reported again, which is the same as operations at 501 and will not be repeated herein.

At 703, the user terminal reports the second message to the network device.

The second message includes an SR or other messages.

Furthermore, the SR may be an SR used for requesting scheduling of the UL resource, i.e., the SR has a same type as an SR reported to the network device in data transmission. The second message also may be an SR only used for requesting scheduling of the UL resource for transmitting the N first messages. Specifically, a type of the SR is represented through an index identity of the SR, e.g., the type of the SR is represented through a seventh bit of the index identity of the SR.

At 704, the network device schedules the first UL resource.

At 705, the user terminal reports the N first messages to the network device through the first UL resource.

Of course, a transmission priority of each of the N first messages may be set to be higher than that of the data to-be-transmitted when the N first messages are reported to the network device through the first UL resource.

It can be seen that, in implementations of the disclosure, when the user terminal triggers the UL LBT failure event on the SCell, the user terminal transmits the first message to the network device through a first communication resource, to indicate the UL LBT failure event, thereby facilitating the network device to control the UL LBT failure event, avoiding UL RLF, and thus optimizing the communication process. In addition, when there is no available UL resource in the CG, the first UL resource is requested to be scheduled through the second message, thus providing a manner of reporting the UL LBT failure event, improving a success rate of reporting the UL LBT failure event, thereby facilitating the network device to control the UL LBT failure event.

Figure 9:
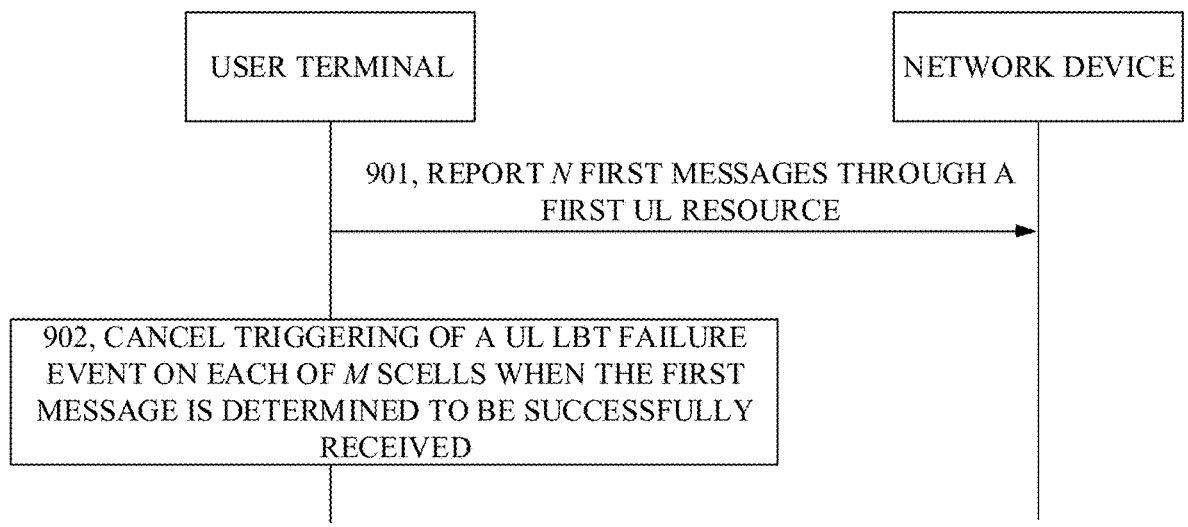
FIG. 9 is a schematic flow chart illustrating another method for information transmission provided in implementations of the disclosure.

FIG. 9 is a schematic flow chart illustrating another method for information transmission provided in implementations of the disclosure. Contents in the implementation herein are the same as those in the implementations illustrated in FIG. 2, FIG. 5, and FIG. 7 and will not be repeated herein. The method includes but is not limited the following.

At 901, a user terminal reports N first messages through a first UL resource.

Alternatively, whether an available UL resource is in a CG is first determined before the N first messages are reported through the first UL resource, which is the same as operations at 501 and 701 and will not be repeated herein.

In addition, a transmission priority of each of the N first messages may be set to be higher than that of data to-be-transmitted after the first UL resource is determined.

At 902, if the user terminal determines that the first messages are successfully received, the user terminal cancels triggering of a UL LBT failure event on each of M SCells.

Alternatively, if a retransmission scheduling for the N first messages is not received in a first duration, the user terminal determines that the N first messages are successfully received by the network device. Under a condition that the N first messages include one first message, if a retransmission scheduling for the first message is not received in the first duration, it is determined that the first message is successfully received by the network device. Under a condition that the N messages include multiple first messages, if a retransmission scheduling for each of the multiple first messages is not received in the first duration, it is determined that the multiple first messages are successfully received by the network device. If a retransmission scheduling for a first message is received in the first duration, it is determined that the first message is not received by the network device.

Alternatively, if a retransmission scheduling of an HARQ for the N first messages is received in a second duration, it is determined that the N first messages are successfully received. Under a condition that the N first messages include one first message, if a retransmission scheduling of an HARQ for the first message is received in the second duration, it is determined that the first message is successfully received by the network device. Under a condition that the N messages include multiple first messages, if a retransmission scheduling of an HARQ for each of the multiple first messages is received in the second duration, it is determined that the multiple first messages are successfully received by the network device. If a retransmission scheduling of an HARQ for a first message is not received in the second duration, it is determined that the first message is not successfully received by the network device.

The first duration and the second duration may be a range of a timer or other values, which will not be limited herein.

It can be seen that, in implementations of the disclosure, when the user terminal triggers the UL LBT failure event on the SCell, the user terminal transmits the first message to the network device through a first communication resource, to indicate the UL LBT failure event, thereby facilitating the network device to control the UL LBT failure event, avoiding UL RLF, and thus optimizing the communication process. In addition, the user terminal directly cancels triggering of the UL LBT failure event triggered in response to determining that the first message is received by the network device, thereby avoiding repeated reporting.

Figure 10:
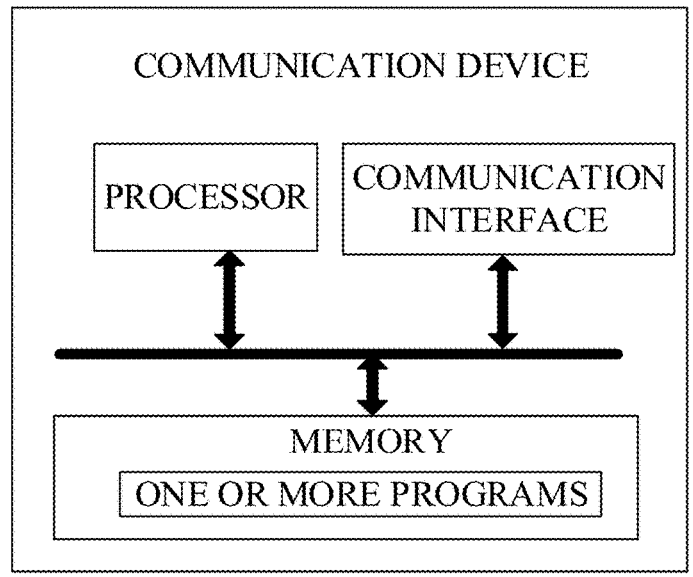
FIG. 10 is a schematic structural diagram illustrating a communication device provided in implementations of the disclosure.

FIG. 10 is a schematic structural diagram illustrating a communication device provided in implementations of the disclosure. The communication device includes one or more processors, one or more memories, one or more transceivers, and one or more programs.

The one or more programs are stored in the memory and configured to be performed by the one or more processors.

In an implementation of the disclosure, the communication device is a user terminal, and the program includes instructions used for performing the following.

N first messages are reported through a first UL resource, where the N first messages are used for indicating that the user terminal triggers M UL LBT failure events on M SCells, a trigger moment of each of the M UL LBT failure events is earlier than a transmission moment corresponding to the first UL resource, the M SCells belong to a same CG, and N and M are positive integers greater than or equal to 1.

In some possible implementations, the program above further includes instructions used for performing the following before the first message is reported through the first UL resource.

When UL LBT failure event A is triggered and an available UL resource is in the CG, the available UL resource is determined as the first UL resource, where the available UL resource includes a dynamically scheduled UL resource and/or a semi-persistently configured UL resource, and the UL LBT failure event A is any one of the M UL LBT failure events.

In some possible implementations, the program above further contains instructions used for performing the following before the first message is reported through the first UL resource.

When UL LBT failure event B is triggered and no available UL resource is in the CG, a second message for the UL LBT failure event B is triggered and reported, where the second message is used for requesting scheduling of the first UL resource, and the UL LBT failure event B is a UL LBT failure event with the earliest trigger moment in the M UL LBT failure events.

In some possible implementations, the second message includes a UL SR.

In some possible implementations, if the first message is represented in a form of a bitmap, a position of bit A in the bitmap is used to indicate a cell identity of an SCell corresponding to the position, a bit value of the bit A is used to indicate whether a UL LBT failure event occurs on the SCell, and the bit A is a bit in the bitmap.

In some possible implementations, a length of the bitmap corresponds to a preset number of SCells in the CG or corresponds to a configured number of SCells in the CG.

In some possible implementations, the program above further includes instructions used for performing the following before the first message is reported through the first UL resource.

A transmission priority of each of the N first messages is set to be higher than that of data to-be-transmitted.

In some possible implementations, the program above further includes instructions used for performing the following.

When the N first messages are determined to be successfully received, triggering of a UL LBT failure event on each of the M SCells is cancelled.

In some possible implementations, the program above further includes instructions used for performing the following.

If a retransmission scheduling for the N first messages is not received in a first duration, the N first messages are determined to be successfully received.

In some possible implementations, the program above further includes instructions used for performing the following.

If a retransmission scheduling of an HARQ for the N first messages is received in a second duration, the N first messages are determined to be successfully received.

In an implementation of the disclosure, the communication device is a network device, and the program includes instructions used for performing the following.

N first messages reported by a user terminal are received, where the N first messages are reported by the user terminal through a first UL resource, where the N first messages are used for indicating that the user terminal triggers M UL LBT failure events on M SCells, a trigger moment of each of the M UL LBT failure events is earlier than a transmission moment corresponding to the first UL resource, the M SCells belong to a same CG, and N and M are positive integers greater than or equal to 1.

In some possible implementations, the program above further includes instructions used for performing the following before the N first messages reported by the user terminal are received.

A second message reported by the user terminal is received.

The first UL resource is scheduled for the user terminal according to the second message.

In some possible implementations, the second message includes a UL SR.

Figure 11:
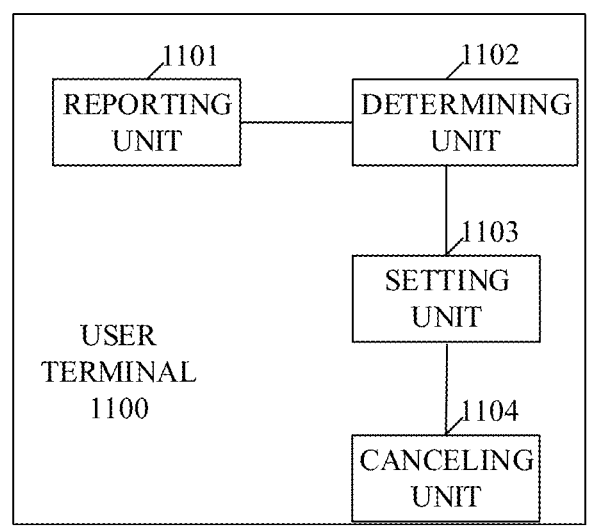
FIG. 11 is a schematic structural diagram illustrating a user terminal provided in implementations of the disclosure.

FIG. 11 is a schematic structural diagram illustrating a user terminal provided in implementations of the disclosure. The user terminal 1100 includes a reporting unit 1101.

The reporting unit 1101 is configured to report N first messages through a first UL resource, where the N first messages are used for indicating that the user terminal triggers M UL LBT failure events on M SCells, a trigger moment of each of the M UL LBT failure events is earlier than a transmission moment corresponding to the first UL resource, the M SCells belong to a same CG, and N and M are positive integers greater than or equal to 1.

In some possible implementations, the user terminal 1100 further includes a determining unit 1102. Before the first message is reported through the first UL resource, the determining unit 1102 is configured to determine, if UL LBT failure event A is triggered and an available UL resource is in the CG, the available UL resource as the first UL resource, where the available UL resource includes a dynamically scheduled UL resource and/or a semi-persistently configured UL resource, and the UL LBT failure event A is any one of the M UL LBT failure events.

In some possible implementations, the user terminal 1100 further includes the determining unit 1102. Before the first message is reported through the first UL resource, the determining unit 1102 is configured to trigger, if UL LBT failure event B is triggered and no available UL resource is in the CG, a second message for the UL LBT failure event B and reports the second message, the second message is used for requesting scheduling of the first UL resource, and the UL LBT failure event B is a UL LBT failure event with the earliest trigger moment in the M UL LBT failure events.

In some possible implementations, the second message includes a UL SR.

In some possible implementations, if the first message is represented in a form of a bitmap, a position of bit A in the bitmap is used to indicate a cell identity of an SCell corresponding to the position, a bit value of the bit A is used to indicate whether a UL LBT failure event occurs on the SCell, and the bit A is a bit in the bitmap.

In some possible implementations, a length of the bitmap corresponds to a preset number of SCells in the CG or corresponds to a configured number of SCells in the CG.

In some possible implementations, the user terminal 1100 further includes a setting unit 1103. The setting unit 1103 is configured to set a transmission priority of each of the N first messages to be higher than that of data to-be-transmitted, before the N first messages are reported through the first UL resource.

In some possible implementations, the user terminal 1100 further includes a canceling unit 1104. The canceling unit 1104 is configured to cancel triggering of a UL LBT failure event on each of the M SCells when the N first messages are determined to be successfully received.

In some possible implementations, the user terminal 1100 further includes the determining unit 1102. The determining unit 1102 is configured to determine that the N first messages are successfully received on condition that a retransmission scheduling for the N first messages is not received in a first duration.

In some possible implementations, the user terminal 1100 further includes the determining unit 1102. The determining unit 1102 is configured to determine that the N first messages are successfully received on condition that a retransmission scheduling of an HARQ for the N first messages is received in a second duration.

Figure 12:
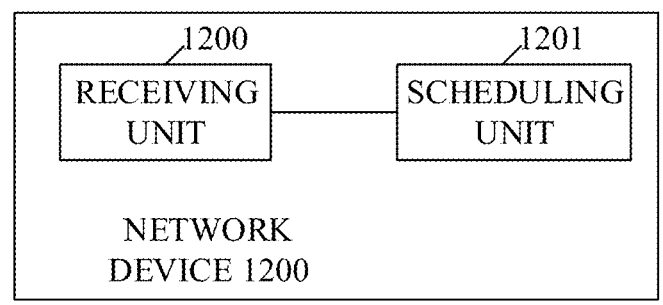
FIG. 12 is a schematic structural diagram illustrating a network device provided in implementations of the disclosure.

FIG. 12 is a schematic structural diagram illustrating a network device provided in implementations of the disclosure. The network device 1200 includes a receiving unit 1201.

The receiving unit 1201 is configured to receive N first messages reported by a user terminal, where the N first messages are reported by the user terminal through a first UL resource, the N first messages are used for indicating that the user terminal triggers M UL LBT failure events on M SCells, a trigger moment of each of the M UL LBT failure events is earlier than a transmission moment corresponding to the first UL resource, the M SCells belong to a same CG, and N and M are positive integers greater than or equal to 1.

In some possible implementations, the first UL resource is determined if the user terminal triggers UL LBT failure event A and an available UL resource is in the CG, where the first UL resource is the available UL resource, the available UL resource includes a dynamically scheduled UL resource and/or a semi-persistently configured UL resource, and the UL LBT failure event A is any one of the M UL LBT failure events.

In some possible implementations, the network device further includes a scheduling unit 1202 before the N first messages reported by the user terminal are received.

The receiving unit 1201 is further configured to receive a second message reported by the user terminal.

The scheduling unit 1202 is configured to schedule the first UL resource for the user terminal according to the second message.

In some possible implementations, if the first message is represented in a form of a bitmap, a position of bit A in the bitmap is used to indicate a cell identity of an SCell corresponding to the position, a bit value of the bit A is used to indicate whether a UL LBT failure event occurs on the SCell, and the bit A is a bit in the bitmap.

In some possible implementations, a length of the bitmap corresponds to a preset number of SCells in the CG or corresponds to a configured number of SCells in the CG.

A computer storage medium is further provided in implementations of the disclosure. The computer storage medium is configured to store computer programs for electronic data interchange. The computer programs enable a computer to execute some or all of the operations of any of the methods described in the method implementations above. The computer includes the user terminal or the network device.

A computer program product is further provided in implementations of the disclosure. The computer program product includes a non-transitory computer-readable storage medium that stores computer programs. The computer programs enable a computer to execute some or all of the operations of any of the methods described in the method implementations above. The computer program product may be a software installation package. The computer includes the user terminal or the network device.

It is to be noted that, for the sake of simplicity, the foregoing method implementations are described as a series of action combinations, however, it will be appreciated by those skilled in the art that the disclosure is not limited by the sequence of actions described. According to the disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the illustration of each implementation has its own emphasis. For the parts not described in detail in one implementation, reference may be made to related illustrations in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the disclosure. The memory includes various medium capable of storing program codes, such as a universal serial bus (USB), flash disk, a read-only memory (ROM), a random-access memory (RAM), a removable hard disk, a disk, a compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a CD, and so on.

The above implementations in the disclosure are described in detail. Principles and implementation manners of the disclosure are elaborated with specific implementations herein. The illustration of implementations above is only used to help understanding of methods and core ideas of the present disclosure. At the same time, for those of ordinary skill in the art, according to ideas of the present disclosure, there will be changes in the specific implementation manners and application scope. In summary, contents of this specification should not be understood as limitation on the present disclosure.

What is claimed is:

1. A method for information transmission, the method being applied to a user terminal and comprising:
   reporting to a network device a first message through a first uplink (UL) resource, the first message being used for indicating that M consistent UL listen before talk (LBT) failure are triggered on M secondary cells (SCells), a trigger moment of each of the M consistent UL LBT failure being earlier than a transmission moment corresponding to the first UL resource, the M SCells belonging to a same cell group (CG), and M being a positive integer greater than 1.

2. The method of claim 1, comprising:
   before reporting the first message through the first UL resource,
   on condition that the consistent UL LBT failure is triggered and an available UL resource is in the CG, determining the available UL resource as the first UL resource.

3. The method of claim 1, comprising:
   before reporting the first message through the first UL resource,
   on condition that the consistent UL LBT failure is triggered and no available UL resource is in the CG, triggering a UL scheduling request (SR), the UL SR being used for requesting the first UL resource.

4. The method of claim 3, wherein the CG is configured with dedicated SR configuration, and the dedicated SR configuration is used for performing the UL SR.

5. The method of claim 1, wherein a transmission priority of the first message is higher than that of data to-be-transmitted.

6. The method of claim 1, wherein the first message is a UL LBT failure medium access control (MAC) control element (CE), and a number of the UL LBT failure MAC CE is 1.

7. The method of claim 6, wherein the first message comprises a bitmap;
   wherein for each bit in the bitmap, a position of the bit corresponds to a cell identity of an SCell, and a bit value of the bit is used to indicate whether a consistent UL LBT failure is triggered on the SCell corresponding to the position of the bit.

8. The method of claim 7, wherein for each bit in the bitmap:
   the bit value of the bit being 1 indicates that a consistent UL LBT failure is triggered on the SCell corresponding to the position of the bit; and
   the bit value of the bit being 0 indicates that no consistent UL LBT failure is triggered on the SCell corresponding to the position of the bit.

9. The method of claim 7, wherein a number of bits in the bitmap corresponds to a configured number of SCells in the CG.

10. The method of claim 1, further comprising:
    in response to determining that the first message is successfully received, canceling the consistent UL LBT failure on each of the M SCells.

11. The method of claim 10, wherein in response to determining that the first message is successfully received, canceling the consistent UL LBT failure on each of the M SCells comprises:
    in response to a retransmission scheduling for the first message being not received in a duration, canceling the consistent UL LBT failure on each of the M SCells.

12. The method of claim 10, wherein in response to determining that the first message is successfully received, canceling the consistent UL LBT failure on each of the M SCells comprises:
    in response to a retransmission scheduling of a hybrid automatic repeat request (HARQ) for the first message being received in a duration, canceling the consistent UL LBT failure on each of the M SCells.

13. A method for information transmission, the method being applied to a network device and comprising:
    receiving a first message reported by a terminal device through a first uplink (UL) resource, the first message being used for indicating that M consistent UL listen before talk (LBT) failure are triggered on M secondary cells (SCells), a trigger moment of each of the M consistent UL LBT failure being earlier than a transmission moment corresponding to the first UL resource, the M SCells belonging to a same cell group (CG), and M being a positive integer greater than 1.

14. The method of claim 13, wherein on condition that the consistent UL LBT failure is triggered and an available UL resource is in the CG, the available UL resource is determined as the first UL resource.

15. The method of claim 13, wherein on condition that the consistent UL LBT failure is triggered and no available UL resource is in the CG, a UL scheduling request (SR) is triggered, and the UL SR is used for requesting the first UL resource.

16. The method of claim 15, wherein the CG is configured with dedicated SR configuration, and the dedicated SR configuration is used for performing the UL SR.

17. The method of claim 13, wherein a transmission priority of the first message is higher than that of data to-be-transmitted.

18. The method of claim 13, wherein the first message is a UL LBT failure medium access control (MAC) control element (CE), and a number of the UL LBT failure MAC CE is 1.

19. The method of claim 18, wherein the first message comprises a bitmap;
wherein for each bit in the bitmap, a position of the bit in the bitmap corresponds to a cell identity of an SCell, and a bit value of the bit is used to indicate whether a consistent UL LBT failure is triggered on the SCell corresponding to the position of the bit.

20. The method of claim 19, wherein for each bit in the bitmap:
the bit value of the bit being 1 indicates that the consistent UL LBT failure is triggered on the SCell corresponding to the position of the bit; and
the bit value of the bit being 0 indicates that no consistent UL LBT failure is triggered on the SCell corresponding to the position of the bit.

* * * * *